United States Patent [19]

Schenk

[11] 4,145,794

[45] Mar. 27, 1979

[54] FRICTIONALLY HELD RECEPTACLE

[75] Inventor: Peter Schenk, West Islip, N.Y.

[73] Assignee: Dzus Fastener Co., Inc., West Islip, N.Y.

[21] Appl. No.: 780,363

[22] Filed: Mar. 23, 1977

[51] Int. Cl.$^2$ .............................................. A44B 21/00
[52] U.S. Cl. .................................................. 24/221 A
[58] Field of Search ............ 24/221 R, 221 A, 221 K, 24/73 RM

[56] References Cited

U.S. PATENT DOCUMENTS

| | | | |
|---|---|---|---|
| 2,314,746 | 3/1943 | White et al. ....................... | 24/221 A |
| 2,969,571 | 1/1961 | Vander Sande et al. ......... | 24/221 A |
| 3,025,093 | 3/1962 | Millman ............................. | 24/221 R |
| 3,975,804 | 8/1976 | Schenk ............................. | 24/221 A |

*Primary Examiner*—Kenneth J. Dorner
*Attorney, Agent, or Firm*—Kane, Dalsimer, Kane, Sullivan & Kurucz

[57] ABSTRACT

A receptacle for use in fastening two members together. The receptacle is adapted to be mounted on one of the two members and to be coupled with a stud mounted on the other of the two members. The receptacle includes a base and a pair of arcuate slightly resilient projections extending from the base. The member to receive the receptacle has surfaces thereon forming a recess conforming to the configuration of the cross section of the receptacle. The relative dimensions of the recess and the receptacle are such that when the projections on the receptacle are resiliently depressed slightly toward one another, the receptacle can be positioned in the recess on the member and the projections released whereupon they will tend to return to their initial configuration and thus frictionally engage with the surrounding walls of the recess so that the receptacle is mounted on the one member. The base has a hole which is aligned with a hole in the one member to receive the stud therethrough. The stud and receptacle are provided with a slot and a corresponding cam follower and a spring to accommodate axial movement of the cam follower in the slot as the stud is rotated relative to the receptacle.

2 Claims, 5 Drawing Figures

FRICTIONALLY HELD RECEPTACLE

BACKGROUND OF THE INVENTION

In certain environments it is desirable to use a quick release type of fastener needed to provide quick and easy access to the interior of a container or for ease of assembly and disassembly of the container in a rapid and efficient manner. One common type of fastener presently employed for these purposes is known as a quarter turn fastener. The object is to provide a device which can shift between the fastened and unfastened conditions with only approximately 90 degrees of rotation of one member with respect to the other. One arrangement for this purpose utilizes a spiral cam slot on one of the parts of the fastener and a cam follower on the part with a spring being employed on either of the two parts to accommodate the axial movement between the parts as the cam follower follows the spiral cam slot between the fastened and unfastened positions. One part is usually identified as a stud and the other part a receptacle. Low cost of manufacture is always important and it is of value to design the fasteners in a manner which makes them usable in a quick and efficient manner. This is particularly advantageous when mass numbers of the fasteners are employed in large or multiple installations.

It is common practice to mount the receptacle on one of the two members in position to receive the stud coupled with the other of the two members. Installation of the receptacle can be time consuming particularly if it is to be mounted by separate fastener elements such as screws or rivets. Accordingly, it is always desirable when a receptacle can be provided which can be installed in a quicker and more efficient manner and which does not require additional fastening parts such as separate screws or rivets. This is particularly true when the receptacle is to be mounted in a hidden or blind location. One can envision how a slight savings in time of installation and in reduction in a number of parts can be extremely valuable when large numbers of fasteners are employed for multiple or large installations.

SUMMARY OF THE INVENTION

With the above background in mind, it is among the primary objectives of the present invention to provide a receptacle for coupling with a stud to fasten two members together. The fastener assembly is of the quarter turn type whereby a cam follower and spiral cam slot are employed for coupling purposes. The receptacle is designed with a substantially rigid but slightly resilient portion which permits alteration of its configuration for insertion into an accommodating recess on one of the members to be fastened so that when the slightly resilient portion of the receptacle is released it will tend to return to its original configuration and frictionally engage with the surrounding surfaces forming the recess to receive the receptacle in the one member and retain the receptacle in mounted position on the one member for receipt of the stud coupled to the other member. It is an objective to provide a single piece receptacle which independently can be mounted to the one member without the necessity of additional component parts. Furthermore the receptacle is designed with an aperture and a cam follower in the form of a spring having a portion aligned to diametrically cross the aperture and terminating in a pair of coiled ends mounted directly to the receptacle. The central portion of the spring forms the resilient cam follower for the spiral slot in the end of a stud. The stud is of the type having an enlarged head in a reduced diameter body portion for insertion through an aperture in the other member to be fastened. The stud is then passed through aligned apertures in the one member and the receptacle into engagement with the spring cam follower whereupon rotation of the stud will cause the cam follower to follow the slot with axial movement being permitted by the spring cam follower. The biased spring will then tend to hold the members together while it is positioned in the end of the spiral cam slot. Naturally, reverse rotation of the stud will free the cam follower and permit the members to be disassembled. Thus, a two piece assembly is provided with a one piece receptacle mounted directly to one member and a one piece stud mounted to the other member.

Additionally, it is an objective of the invention to provide a cross sectional configuration for the recess in the member receiving the receptacle which conforms to the cross sectional configuration of the receptacle with dimensional differences being provided to require the biasing of portions of the receptacle for insertion and release thereafter to obtain the frictional interengagement to hold the receptacle in position. It is also an objective to enhance the ease and efficiency of mounting of the receptacle in the member by providing beveled surfaces on the receptacle and corresponding beveled surfaces on the receiving recess in the one member to facilitate initiation of introduction of the receptacle into the receiving recess.

In summary, a receptacle is provided for use in fastening two members together. The receptacle is adapted to be mounted on one of the two members and to be coupled with a stud mounted on the other of the two members. The receptacle includes a base with an opening therein to be aligned with a corresponding opening on the one member to receive therethrough a portion of a stud mounted in an aligned opening on the other member. Engagement surfaces are on the receptacle conforming with receiving surfaces on the one member to permit frictional interengagement therebetween and a consequent mounting of the receptacle on the one member with the opening in the base aligned with the opening in the one member. One of the receptacle and the stud has a spiral cam slot thereon and the other of the receptacle and the stud has a cam follower thereon. The spiral cam slot and cam follower are positioned for alignment when the stud is passed through the opening in the base. Spring means is on one of the receptacle and base to permit the cam follower to shift in the spiral cam slot between the fastened and unfastened positions during relative rotation between the receptacle and stud.

With the above objectives among others in mind, reference is made to the attached drawings.

DESCRIPTION OF THE PREFERRED EMBODIMENT

Figure 3:
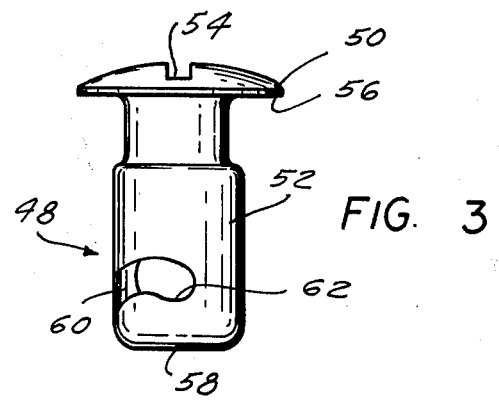
FIG. 3 is a side elevation view of a stud to be coupled to the receptacle of the invention.

Receptacle 20 includes a relatively flat base portion 22 and a pair of opposing projections 24 and 26. Each projection extends upwardly from an opposed longer edge of base 22. Each projection is integrally formed with the base and is shaped so that is extends arcuately upward and inward to a free edge. Thus, projection 24 terminates in free edge 28 and projection 26 ends in free edge 30. The free edges 28 and 30 have beveled end portions 32.

Figure 2:
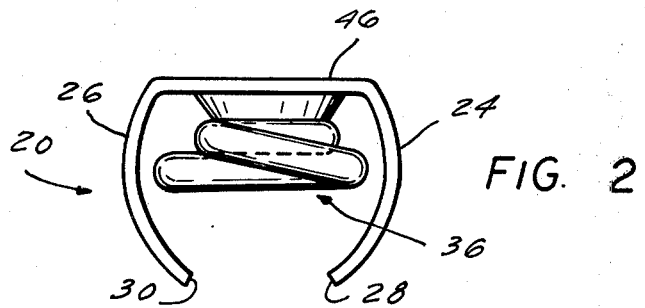
FIG. 2 is an end view thereof.
Figure 1:
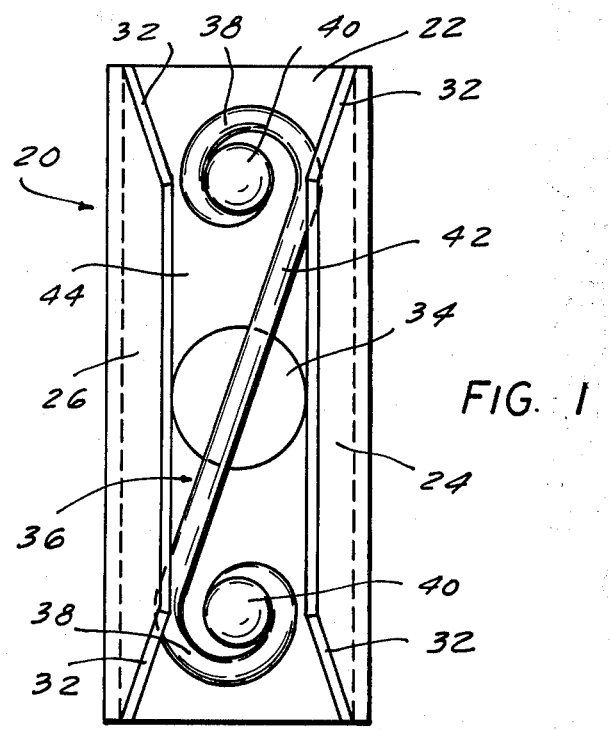
FIG. 1 is a top plan view of the receptacle of the invention.

The relatively flat rectangular shaped base 22 has a central opening 34 and has a wound spring like member 36 mounted thereon. The coiled ends 38 of the spring member are mounted to the base by means of rivets 40. Naturally the spring can be mounted in any other conventional fashion. The ends 38 communicate with a straight central portion 42 which forms a bar diametrically crossing opening 34 on the side of the base containing projections 24 and 26. In this manner, all of the elements of receptacle 20 integrally formed or mounted to base 22 extend from one side 44 of the base. The opposite side 46 forms a flat engaging surface for flush engagement with the wall of one member to be fastened. The general cross sectional configuration of receptacle, as shown in FIG. 2, is substantially D-shaped with a curved portion of the D being interrupted by the distance between free edges 28 and 30.

Receptacle 20 is manufactured of a low cost, mass producible material such as cadmium-plated steel with the steel material for spring member 36 having sufficient resilience to provide the necessary spring action for the spring and the steel material for arcuate projections 24 and 26 having slight resilience which is assisted by their free ends so that they act similar to cantilever members and can be resiliently displaced by pressure applied to the outer surfaces thereof so as to direct the projections 24 and 26 and accordingly free edges 28 and 30 toward one another. The material is chosen so that release of the pressure applied inwardly to projections 24 and 26 will permit the relatively rigid and stiff projections to tend to return to their initial configuration and thus apply an outward force which is utilized in mounting the receptacle in position as will be discussed in detail below. Naturally a relatively rigid but slightly resilient plastic or other material having similar properties can be used in place of the steel material for receptable 20. Also, in place of rivets 40, other conventional fastening mechanisms can be utilized to attach spring member 36 to side 44 of base 22. For example the spring member can be welded in position or affixed by tacks or screws.

Receptacle 20 is designed to couple with a stud such as that depicted in FIG. 3. In the depicted embodiment stud 48 is formed of a conventional cadmium-plated steel material such as utilized for the receptacle. Once again, conventional substitute materials can be used in place of the cadmium-plated steel as long as the necessary strength is imparted to the stud 48 and the cost of manufacture is maintained at a low level to facilitate mass production.

Stud 48 has an enlarged head 50 and a reduce diameter body portion 52 extending from the underside of the head. The enlarged head has a central slot 54 in its surface opposite to the body portion of the stud for receipt of an appropriate tool to rotate the stud in the unfastening and fastening operations. The undersurface of the head 56 extending outwardly from body portion 52 forms a bearing surface for the stud when mounted in a member being fastened. In the end 58 of the stud distal from the head 50 is a spiral cam stot 60 formed directly in the body 52 of the stud. The spiral cam slot terminates in a detent 62 for spring 42 in the fastened condition.

In operation, receptacle 20, when coupled with stud 48, is adapted for use in the quick and efficient fastening and unfastening of two members together for the purpose of providing ready access to the interior of the container or for facilitating rapid assembly and disassembly of a structure such as a box or container.

Figure 4:
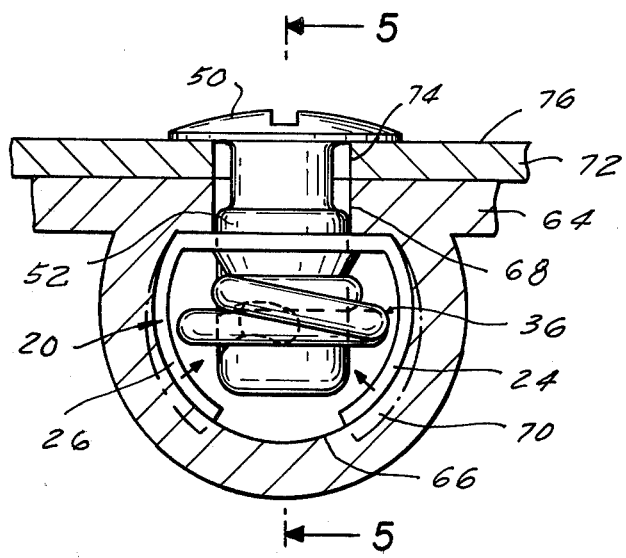
FIG. 4 is a sectional side elevation view of the receptacle of the invention coupled with the stud in holding two members together.
Figure 5:
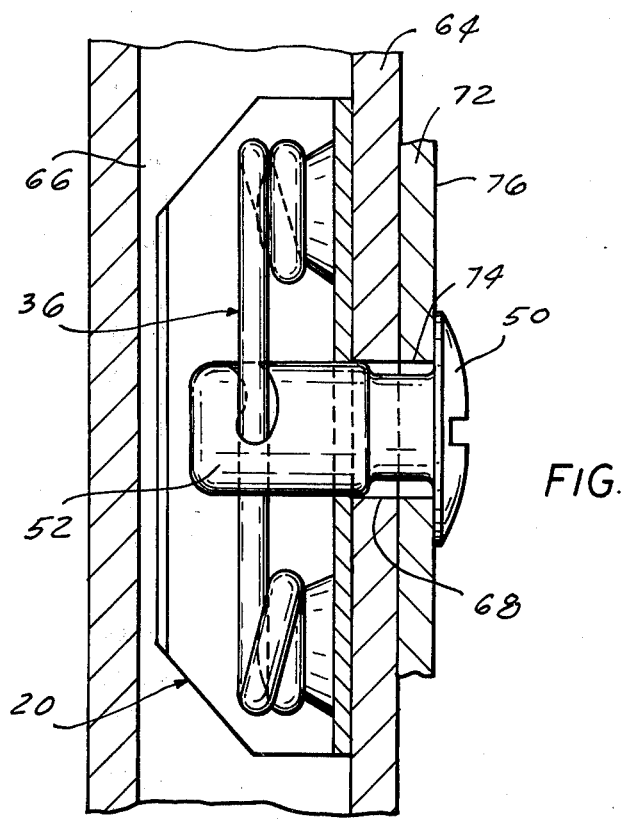
FIG. 5 is a sectional end view thereof taken along the plane of line 5—5 of FIG. 4 and rotated 90°.

As depicted in FIGS. 4 and 5 one of the members 64 to be fastened together will contain at least one D-shaped recess 66 having a configuration and size large enough to permit the sliding of receptacle 20 therein when projections 24 and 26 are depressed toward one another. The relative dimensions are designed so that when the receptacle 20 has been fully positioned in the desired location within D-shaped recess 66 and projections 24 and 26 are released they will expand and further tend to expand so that they apply a force outwardly against the adjacent walls of the recess 66 thus frictionally engaging with the walls and mounting the receptacle in fixed position.

Member 64 is provided with an opening 68 in position with respect to D-shaped recess 66 so that when receptacle 20 is properly positioned within the recess, opening 34 in the receptacle will be aligned with opening 68 in the member 64 so that stud body 52 can be extended through the aligned openings and coupled with spring member 36.

To facilitate insertion of receptacle 20 within recess 66, the ends of free edges 28 and 30 have beveled portions 32 which cooperate with accommodating beveled entrance portion 70 on D-shaped recess 66 to assist in starting the receptacle inwardly into proper position in the recess. This speeds up installation of the receptacles and enhances the low assembly time for the fastener installation. Naturally this is further enhanced by the fact that the entire fastening structure is incorporated on the receptacle and no separate fastener elements such as screws or bolts or rivets need be utilized. The receptacle is fully mounted with frictional engagement from projections 26 and 29 holding it in position within the recess.

The other member 72 which is to be fastened to member 64 also contains an aperture 74 which is located in position for alignment with aperture 68 in member 64 when the members are positioned for coupling. Stud body 52 is extended through aperture 74 in member 72 until the undersurface 56 of head 50 engages with the upper surface 76 of member 72 thus forming a bearing and holding surface for member 72 in the coupled condition. The stud is then passed through opening 68 and aligned opening 34 in receptacle 20. Slot 60 is then in position to engage with central bar portion 42 of spring cam follower 36. Thereafter, an appropriate tool positioned in slot 54 and rotation of stud 48 will cause cam follower central bar portion 42 to follow the spiral cam slot 60 until it snaps into position in detent 62. The resilient nature of the spring member 36 facilitates this axial movement of central portion 42 within the cam slot and additionally provides a holding force by the bias on spring member 36 when it is positioned in the detent to assist in holding members 72 and 64 together. In this position as depicted in FIGS. 4 and 5, members 64 and 72 are fastened together.

To unfasten the assembly, it is merely necessary to rotate the stud in the opposite direction thus permitting bar cam follower 42 to travel in the opposite direction along spiral cam slot 60 until it is free of the slot permitting the stud and member 72 to be removed from the aperture 68 and 34 thus unfastening and disassembling members 72 and 64. It is conventionally acceptable to utilize a spiral cam slot having a length which permits shifting between the fastened and unfastened positions with approximately a quarter-turn rotation of the stud. This naturally facilitates the quick and efficient operation of the stud in its fastening and unfastening operation. This is particularly useful where many fasteners are used in a large installation.

Naturally other embodiments employing the same principle of the present invention can be readily envisioned. For example, the cam slot can be formed on a structure mounted on side 44 of base 22 in position with respect to aperture 34 to receive a stud containing a cam follower. Thus, the positions of the slot and cam follower are reversed with respect to the stud and the receptacle. Also, instead of incorporating the spring action for the axial movement of the cam follower with respect to the cam slot as part of the spring member and cam follower bar 36, it is possible to have a separate cam follower on base 22 in proper position with respect to aperture 34 to engage with slot 60 and to provide the axial spring action as part of the receiving receptacle structure or as part of the stud structure 48.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A receptacle for use in fastening two members together, the receptacle adapted to be mounted on one of the two members and to be coupled with a stud mounted on the other of the two members, the receptacle comprising; a base with an opening therein to be aligned with a corresponding opening on the one member to receive therethrough a portion of a stud mounted in an aligned opening on the other member, engagement surfaces on the receptacle conforming with receiving surfaces of the one member to permit frictional interengagement therebetween and the consequent mounting of the receptacle on the one member with the opening in the base aligned with the opening in the one member, one of the receptacle and stud having a spiral cam slot thereon and the other of the receptacle and stud having a cam follower thereon in position for alignment therebetween when the stud is passed through the opening in the base, spring means on one of the receptacle and base to permit the cam follower to shift in the spiral cam slot between the fastened and unfastened positions during relative rotation between the receptacle and stud, the receptacle base being substantially flat in configuration and the surfaces for frictional engagement being a pair of opposed arcuate projections with each projection extending upwardly and inwardly toward one another from opposing edges on the base and terminating in a free end, the receptacle projections being formed of relatively stiff material with a slight resilience assisted by the free end on each projection so that the projections can be resiliently displaced to change the configuration of the receptacle and thereafter released to return to their initial configuration, the receptacle having a D-shaped cross section, the receiving surfaces on the one member being positioned so that they form a D-shaped recess to generally conform with the D-shaped cross section of the receptacle, and the recess being dimensioned so that when the projections on the receptacle are resiliently displaced toward one another the receptacle can be introduced into the D-shaped recess until the opening in the base is aligned with the opening in the one member whereupon release of the resiliently deformed projections will permit them to tend to return toward their initial configuration and to frictionally engage with the adjacent conforming surface of the D-shaped opening in the one member thereby mounting the receptacle in position on the one member.

2. The invention in accordance with claim 1 wherein the D-shaped opening in the one member is provided with a beveled entranceway to facilitate introduction of the receptacle therein.

* * * * *